(12) United States Patent
Jo et al.

(10) Patent No.: US 10,058,154 B2
(45) Date of Patent: Aug. 28, 2018

(54) PROTECTIVE COVER AND MANUFACTURING METHOD THEREOF

(71) Applicant: Samsung Electronics Co., Ltd., Gyeonggi-do (KR)

(72) Inventors: Joonyoung Jo, Gyeonggi-do (KR); Taeseuk Kang, Gyeonggi-do (KR); Donghyeon Kim, Gyeonggi-do (KR); Bitna Kim, Gyeongsangnam-do (KR); Hosung Bang, Daegu (KR); Haewon Sung, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 62 days.

(21) Appl. No.: 15/056,151

(22) Filed: Feb. 29, 2016

(65) Prior Publication Data

US 2016/0249731 A1 Sep. 1, 2016

(30) Foreign Application Priority Data

Feb. 27, 2015 (KR) .................. 10-2015-0027801

(51) Int. Cl.
| | |
|---|---|
| *A45C 11/00* | (2006.01) |
| *A45C 5/02* | (2006.01) |
| *H04B 1/3888* | (2015.01) |
| *G06F 1/16* | (2006.01) |
| *H04M 1/02* | (2006.01) |
| *H04M 1/18* | (2006.01) |

(52) U.S. Cl.
CPC ............... *A45C 11/00* (2013.01); *A45C 5/02* (2013.01); *G06F 1/1626* (2013.01); *H04B 1/3888* (2013.01); *A45C 2011/001* (2013.01); *A45C 2011/002* (2013.01); *A45C 2011/003* (2013.01); *G06F 2200/1633* (2013.01); *H04M 1/0214* (2013.01); *H04M 1/185* (2013.01)

(58) Field of Classification Search
CPC ..... A45C 11/00; A45C 5/02; A45C 2011/001; A45C 2011/002; A45C 2011/003; G06F 1/1626; G06F 2200/1633; H04B 1/3888; H04M 1/0214; H04M 1/185
See application file for complete search history.

(56) References Cited

U.S. PATENT DOCUMENTS

| | | | |
|---|---|---|---|
| D610,579 S | 2/2010 | Behar et al. | |
| 9,380,138 B2 * | 6/2016 | Cha | ..... H04M 1/0283 |
| D796,515 S * | 9/2017 | Kim | ............ D14/440 |
| 2012/0261289 A1* | 10/2012 | Wyner | ........ A45C 11/00 |
| | | | 206/320 |
| 2014/0216954 A1* | 8/2014 | Law | .......... A45F 5/02 |
| | | | 206/45.23 |

(Continued)

*Primary Examiner* — Corey Skurdal
(74) *Attorney, Agent, or Firm* — The Farrell Law Firm, P.C.

(57) ABSTRACT

A method of manufacturing a protective cover for an electronic device is disclosed. The method includes forming an inner skin by blanking, blanking an outer skin of a fabric member in a shape corresponding to the blanked inner skin, forming a preform of a protective cover by laminating the inner skin and the outer skin with each other, thermo-compressing the laminated preform along an outer peripheral edge of the protective cover and forming the protective cover by cutting at least a portion of a region where the preform is thermo-compressing by the blanking.

11 Claims, 17 Drawing Sheets

(56) References Cited

U.S. PATENT DOCUMENTS

| | | | |
|---|---|---|---|
| 2015/0014188 A1* | 1/2015 | Pyo | A45C 11/00 206/37 |
| 2015/0060309 A1* | 3/2015 | Sartee | A45C 11/00 206/37 |
| 2015/0229754 A1* | 8/2015 | Won | G06F 1/165 455/575.8 |
| 2015/0272303 A1* | 10/2015 | Brown | A45C 11/00 224/191 |
| 2017/0224075 A1* | 8/2017 | Brown | A45C 11/00 |
| 2017/0338845 A1* | 11/2017 | Griffin, II | G06F 1/1656 |

\* cited by examiner

PROTECTIVE COVER AND MANUFACTURING METHOD THEREOF

PRIORITY

This application claims priority under 35 U.S.C. § 119(a) to Korean Patent Application Ser. No. 10-2015-0027801, which was filed in the Korean Intellectual Property Office on Feb. 27, 2015, the entire content of which is incorporated herein by reference.

BACKGROUND

1. Field of the Disclosure

The present disclosure relates to an electronic device having a protective cover and in particular to a protective cover and a method of manufacturing the protective cover.

2. Description of the Related Art

Consumers purchasing an electronic device, such as an expensive smart phone, use the electronic device with a separate protective cover mounted on the electronic device in order to protect the exterior of the electronic device and to maintain a secure grip on the electronic device. Such a protective cover is formed of a material that has a suitable texture. The protective cover is configured in a manner to allow folding, so that when the electronic device is used, an opening/closing part of the protective cover is opened to expose a display (e.g., a touch screen), and when the electronic device is not used, the opening/closing part is closed to cover the display, thereby protecting the entire electronic device. However, such a protective cover focuses only on the protection of the electronic device and is inadequate in improving the aesthetics of the electronic device due to limitations in the material that is used.

SUMMARY

The present disclosure has been made to address at least the above mentioned disadvantages and problems, and to provide at least the advantages described below.

Accordingly, an aspect of the present disclosure provides a protective cover and a method of manufacturing the same.

Another aspect of the present disclosure, a protective cover is provided that improves the aesthetics of the electronic device by applying a fabric member to the exterior of the protective cover, and a method of manufacturing the same.

Another aspect of the present disclosure, a protective cover is provided that is produced with high quality and may be manufactured by attachment of a fabric member, and a method of manufacturing the same.

According to an aspect of the present disclosure, a method of manufacturing a protective cover is provided. The method includes forming an inner skin by blanking, blanking an outer skin of a fabric member into a shape corresponding to the blanked inner skin, forming a preform of a protective cover by laminating the inner skin and the outer skin with each other, thermo-compressing the laminated preform along an outer peripheral edge of the protective cover, and forming the protective cover by cutting at least a portion of a region where the preform is thermo-compressed by the blanking.

According to another aspect of the present disclosure, a protective cover manufactured according to the above-described manufacturing method is provided. The protective cover includes an inner skin made of a polyurethane (PU) material, an outer skin formed of a fabric member having a shape corresponding to that of the inner skin and attached to the inner skin, a reinforcement plate interposed in at least a portion between the inner skin and the outer skin and a cradle attached to at least a portion of the outer skin to accommodate the electronic device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
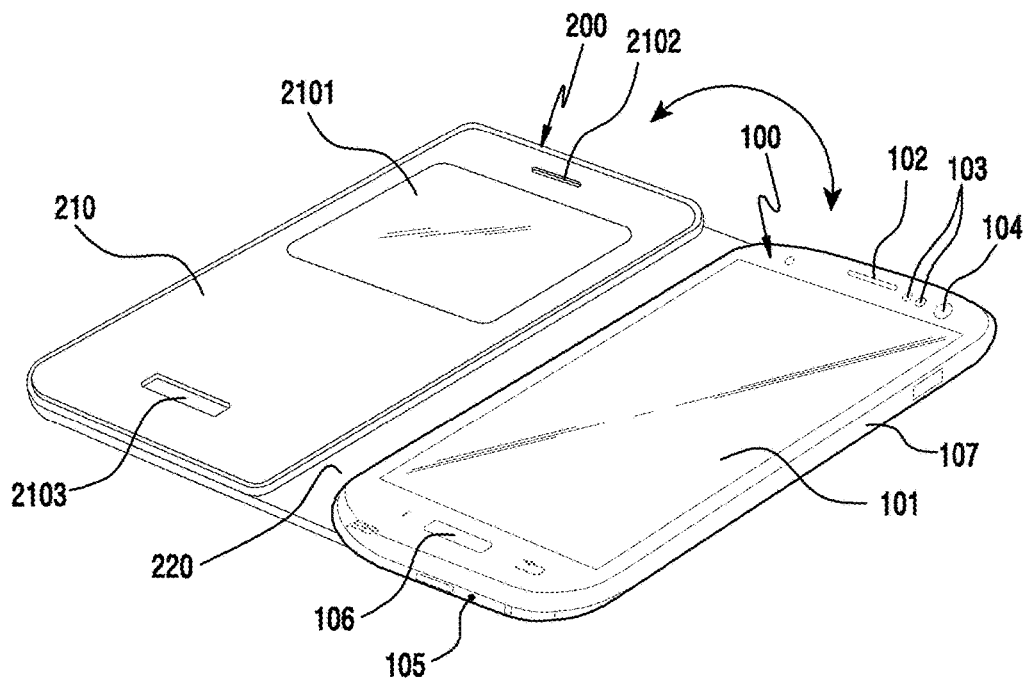
FIG. 1 is a perspective view illustrating a protective cover for an electronic device according to various embodiments of the present disclosure.

Hereinafter, various embodiments of the present disclosure will be described with reference to the accompanying drawings. The present disclosure may be modified in various forms and include various embodiments. The present disclosure includes specific examples illustrated in the drawings and described in the description. However, the description is not limited to the specific embodiments of the present disclosure and it shall be appreciated that all the changes, equivalents and substitutions belonging to the idea and technical scope of the present disclosure are included in the present disclosure. In the description of the drawings, identical or similar reference numerals are used to designate identical or similar elements.

The terms "include" or "may include" refer to a corresponding disclosed function, operation or component which may be used in various embodiments of the present disclosure and do not limit one or more additional functions, operations or components. In the present disclosure, terms such as "include" or "have" may be construed to denote a certain characteristic, number, step, operation, constituent element, component or a combination thereof, but are not to be construed to exclude the existence of or a possibility of the addition of one or more other characteristics, numbers, steps, operations, constituent elements, components or combinations thereof.

The term "or" used in various embodiments of the present disclosure includes any or all combinations of listed expressions. For example, the expression "A or B" may include A, may include B, or may include both A and B.

The expressions such as "first", "second", and the like, used in describing various embodiments of the present disclosure may modify various component elements in the various embodiments but do not limit corresponding component elements. For example, the above expressions do not limit the sequence and/or importance of the elements. The expressions may be used to distinguish a component element from another component element. For example, a first user device and a second user device indicate different user devices although both of them are user devices. For example, a first element may be referred to as a second element, and similarly, a second element may be referred to as a first element without departing from the scope of the present disclosure.

When it is described that a certain structural element "is connected to" or "is in contact with" another structural element, it is understood that although the certain structural element is directly connected to or is in direct contact with another structural element, still another structural element may be interposed between them. Conversely, when one component element is "directly coupled" or "directly connected" to another component element, it may be construed that a third component element does not exist between the first component element and the second component element.

The terms used in various embodiments of the present disclosure are used to describe a specific embodiment and are not intended to limit the present disclosure. A singular expression may include a plural expression unless they are expressly different in context.

Unless defined differently within the present disclosure, all terms used herein, which include technical terms or scientific terms, have the same meaning as that understood by a person of ordinary skill in the art to which the present disclosure belongs. Such terms as those defined in a dictionary are to be interpreted to have the same meanings as the contextual meanings in the relevant field of art and are not to be interpreted to have ideal or excessively formal meanings unless clearly defined in the present disclosure.

An electronic device according to various embodiments of the present disclosure may be a device with a communication function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo and a smart watch.

According to various embodiments of the present disclosure, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., Home-Sync™ of Samsung, Apple TV™, or Google TV™), game consoles, electronic dictionaries, electronic keys, camcorders, or electronic frames.

According to various embodiments of the present disclosure, the electronic device may include at least one of various medical devices such as a magnetic resonance angiography (MRA) scanner, a magnetic resonance imaging (MRI) scanner, a computed tomography (CT) scanner, a scanner, an ultrasonograph, and the like, a navigation device, a Global Positioning System (GPS) receiver, an Event Data Recorder (EDR), a Flight Data Recorder (FDR), a vehicle infotainment device, an electronic equipment for a ship (for example a ship navigation device and gyro-compass and the like, avionics, a security device, a head unit for vehicle, an industrial or household robot, automatic teller machine (ATM) in banking facilities or point of sales (POS) terminal in stores.

According to various embodiments of the present disclosure, the electronic device may include at least one of furniture or a part of a building/structure, an electronic board, an electronic signature receiving device, a projector and various types of measuring devices (for example, a water meter, an electric meter, a gas meter, a radio wave meter and the like) including a camera function. An electronic device according to various embodiments of the present disclosure may be a combination of one or more of the above described various devices. Also, an electronic device according to various embodiments of the present disclosure may be a flexible device, but is not limited to the above described devices.

Figure 2:
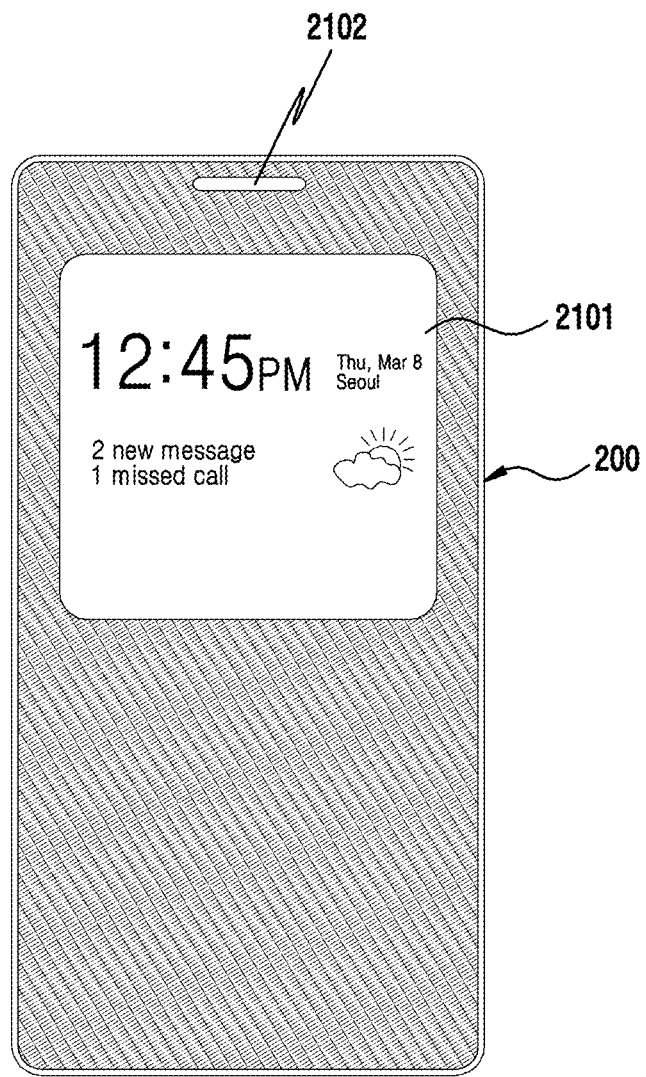
FIG. 2 is a view illustrating a state in which an opening/closing part of the protective cover is closed according to various embodiments of the present disclosure.
Figure 3:
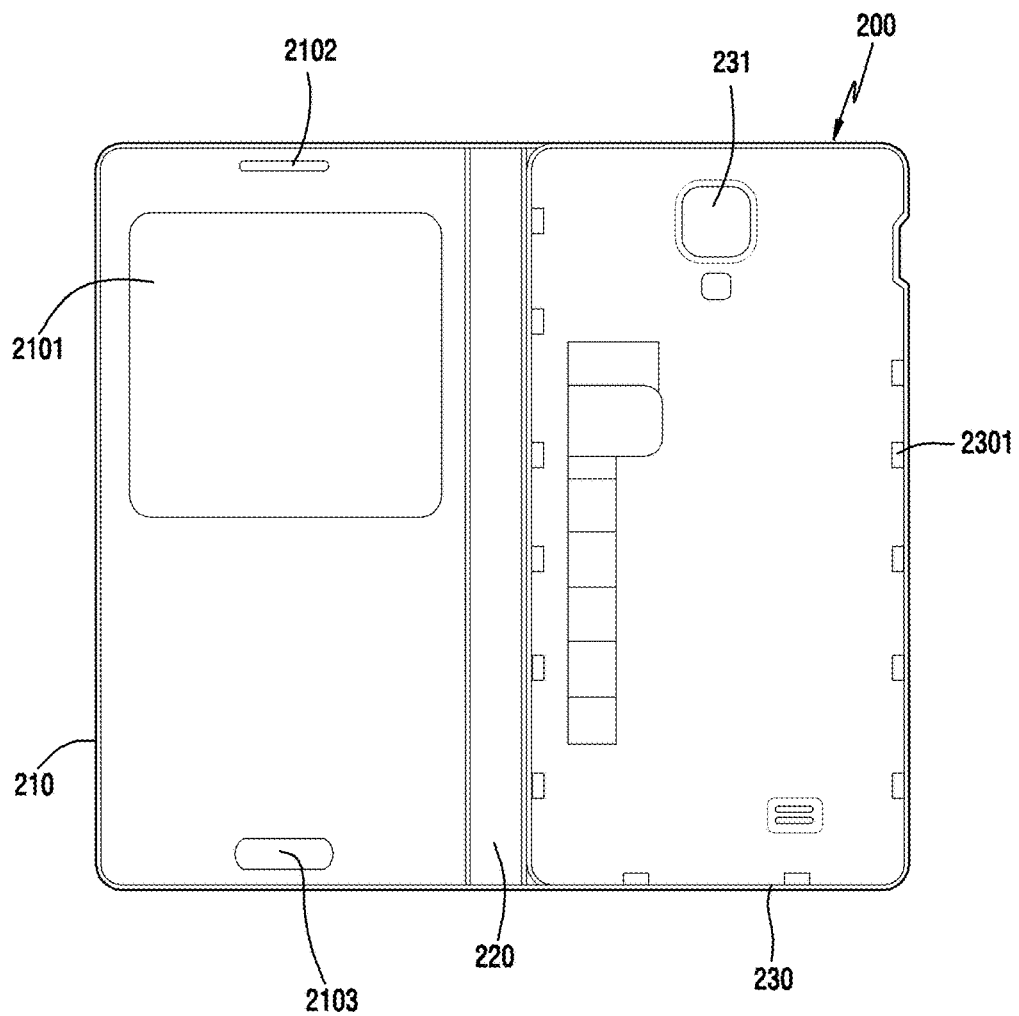
FIG. 3 is a view illustrating a configuration of the protective cover according to various embodiments of the present disclosure.

FIG. 1 is a perspective view illustrating a protective cover for an electronic device according to various embodiments of the present disclosure. FIG. 2 is a view illustrating a state in which an opening/closing part of the protective cover is closed according to various embodiments of the present disclosure. FIG. 3 is a view illustrating a configuration of the protective cover according to various embodiments of the present disclosure.

Referring to FIGS. 1 to 3, an electronic device 100 protected by the protective cover 200 includes a display 101, a speaker device 102 provided above the display 101, a plurality of sensors 103 arranged on a side of the speaker device 102, a camera device 104 arranged on a side of the sensors 103 and a microphone device 105 provided below the display 101. However, without being limited thereto, other elements may be added in addition to the above-mentioned elements and among the above-mentioned elements, one or more elements may be excluded, except for the display 101.

According to various embodiments of the present disclosure, the electronic device 100 may be protected by a protective cover 200 that is coupled or attached to the electronic device 100 in a folder type, a sliding type or a flip type. The protective cover 200 includes a cradle 230 that supports the rear surface of the electronic device 100, an opening/closing part 210 that protects at least a portion of the display of the electronic device 100, an interconnection part 220 that integrally extends from the opening/closing part 210 and is connected to the cradle 230. The cradle 230 may serve as a battery cover of the electronic device 100. The cradle 230 may be formed as a member that is separate from the electronic device 100.

According to various embodiments of the present disclosure, the opening/closing part 210 of the protective cover 200 may be installed to be rotatable in a direction indicated by an arrow in FIG. 1 by being connected to the cradle 230 by the interconnection part 220. Accordingly, as illustrated in FIG. 2, in order to protect the display 101 of the electronic device 100, the opening/closing part 210 is arranged such that the opening/closing part 210 is placed on and overlaps with at least a portion of the top surface of the display 101 of the electronic device 100.

According to various embodiments of the present disclosure, a transparent window 2101 is provided on the opening/closing part 210, a part of the display 101 of the electronic device 100 and may be viewed when the opening/closing part 210 is closed. Accordingly, as illustrated in FIG. 2, the electronic device 100 senses that the opening/closing part 210 is closed and displays status information of the electronic device 100 in a region of the display 101 which corresponds to the transparent window 2101, so that a user may use the electronic device 100 through the transparent window 2101 even when the opening/closing part 210 is closed.

Although a single transparent window 2101 is arranged in a portion above the opening/closing part 210, various embodiments of the present disclosure are not limited thereto. For example, depending on the operation method of the electronic device 100, a plurality of transparent windows may be arranged at different positions in the opening/closing part 210 so that the status information of the electronic device 100 may be displayed together or individually. The transparent window 2101 may have an area that does not exceed 50% of the entire area of the opening/closing part. However, without being limited thereto, the transparent window 2101 may have areas of various sizes. A button accommodation recess 2103 may be formed on a face of the opening/closing part 210 that comes in contact with the display 101 so that it is possible to prevent a key button 106 protruding from the electronic device 100 from being pushed accidently when the opening/closing part 210 is closed.

While the present embodiment forms the opening/closing part 210 in a size that coincides with the display 101 of the electronic device 100, the present disclosure are not limited thereto. For example, the opening/closing part 210 may be formed to have a shape that is capable of protecting the side surface 107 of the electronic device 100 when the opening/closing part 210 is closed by forming an end of the opening/closing part 210 to further extend and be foldable over the side surface 107. In the case where an interface portion between the front surface and a side surface of the electronic device is bent and another display is arranged on the bent surface, such a configuration may protect the other display. In addition, the opening/closing part 210, the interconnection part 220 and the cradle 230 of the protective cover 200 may be applied with configurations that correspond to various key buttons, protruding or depressed elements and other elements requiring perforations in the protective cover 200. According to various embodiments of the present disclosure, the cradle 230 may have a plurality of tension protrusions 2301 that are formed at a predetermined interval along the inner peripheral edge of the cradle 230. The tension protrusions 2301 are assembled by being seated in elastic recesses that are correspondingly formed on the rear surface of the electronic device 100 so that the cradle 230 and the electronic device 100 are detachable from/attached to each other.

According to various embodiments of the present disclosure, the cradle 230 may be formed of a synthetic resin material. However, without being limited thereto, the cradle 230 may be formed from at least one material including a metal material, glass fiber reinforced polymer (GFRP), carbon fiber reinforced polymer (CFRP), rubber, silicone, polycarbonates (PC), polycarbonate acrylonitril butadiene styrene (PC-ABS), and polycarbonate glass fiber (PC-GF). The cradle 230 may be applied as a battery cover that is directly assembled on the rear surface of the electronic device 100, but is not limited thereto. The cradle may be of a bumper case type that covers the rear surface of the electronic device.

According to various embodiments of the present disclosure, the cradle 230 may be formed with an opening 231. The opening 231 may serve to expose an element installed on the rear surface of the electronic device 100 (such as a camera device). On the inside or outside of the cradle 230, various additional objects, such as an imaging effect filter and a white balance grey card, may be further applied through the opening 231.

According to various embodiments of the present disclosure, the outer surface of the protective cover 200 may be formed of a fabric member (fabric material). By using the fabric member, the texture of the protective cover when being gripped may be improved and the aesthetics may also be improved.

Figure 4:
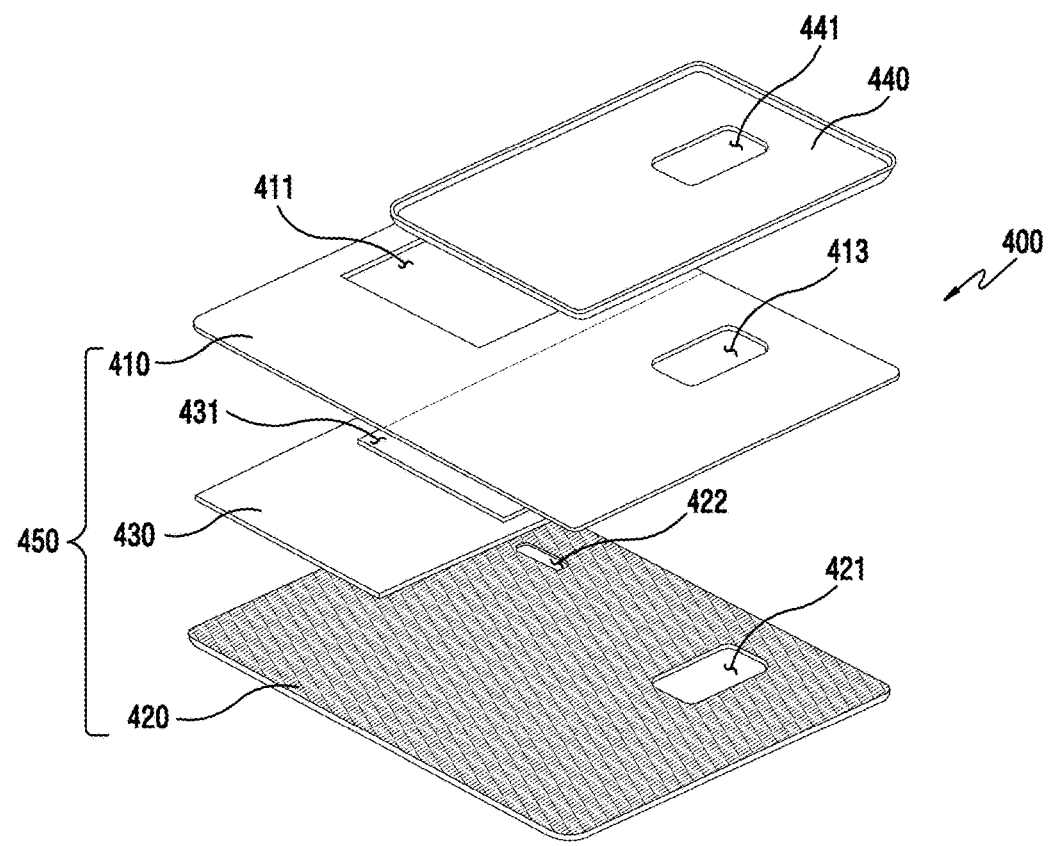
FIG. 4 is an exploded perspective view of a protective cover according to various embodiments of the present disclosure.

FIG. 4 is an exploded perspective view of a protective cover 400 according to various embodiments of the present disclosure. The protective cover 400 of FIG. 4 may have the same configuration as the protective cover 200 of FIG. 1.

Referring to FIG. 4, the protective cover 400 is formed by laminating an inner skin 410, a reinforcement member 430 and an outer skin 420. A cradle 440 may be arranged on an upper portion of the upper side of the protective cover 400 by being attached thereto.

According to various embodiments of the present disclosure, the outer skin 420 may be formed of a fabric member and the inner skin 410 may be formed of a polyurethane (PU) material. The inner skin 410 may be formed of various materials such as metal, PC, GFRP, CFRP and glass in addition to PU. The inner skin 410 may be formed with a window opening 411 having a predetermined area, a receiver opening 412 (see FIG. 6C) may be formed above the window opening 411 and a camera lens opening 413 may be formed at a side of the window opening 411. At corresponding positions in the outer skin 420 formed of the fabric member, a camera lens opening 421 and a receiver opening 422 may also be arranged. A cradle 440 may also have a camera lens opening 441 that is formed at a position that corresponds to the camera lens opening 413 of the inner skin 410 and the camera lens opening 421 of the outer skin 420, which are described above.

According to various embodiments of the present disclosure, the reinforcement member 430 may be formed of a transparent material and may be configured to include a transparent window 431. The reinforcement member 430 may be formed of transparent acryl, glass, and the like, and the region of the transparent window 431 may be formed to protrude with a height to be seated in the window opening 411 of the inner skin 410. The protruding height of the transparent window 431 of the reinforcement member 430 may be formed to be equal to the depth of the window opening 411 of the inner skin 410. When the outer skin 420 and the inner skin 410 are laminated with each other, a seating portion, on which the reinforcement member 430 is seated, may be formed on the inner skin 410 for the purpose of uniform plane contact. Accordingly, the reinforcement member 430 seated on the outer skin 420 may be arranged to form a flat surface with the surface of the inner skin 410.

According to various embodiments of the present disclosure, hot melt may be used in order to bond the outer skin 420 and the inner skin 410 to each other. Hot melt refers to a hot melt type adhesive that is formed of a thermoplastic resin so that the hot melt is applied to a material to be bonded in a liquid phase at a high temperature without using water or solvent and exhibits an adhesive force when cooled and solidifies within several seconds after being pressed. The hot melt allows the outer skin 420 formed of a fabric material and the inner skin 410, which is formed of a PU material, to be adhered. The cradle 440 and the inner skin 410 may also be adhered to each other by the hot melt. The reinforcement member 430 and the inner skin 410 may also be adhered to each other by the hot melt.

Figure 5:
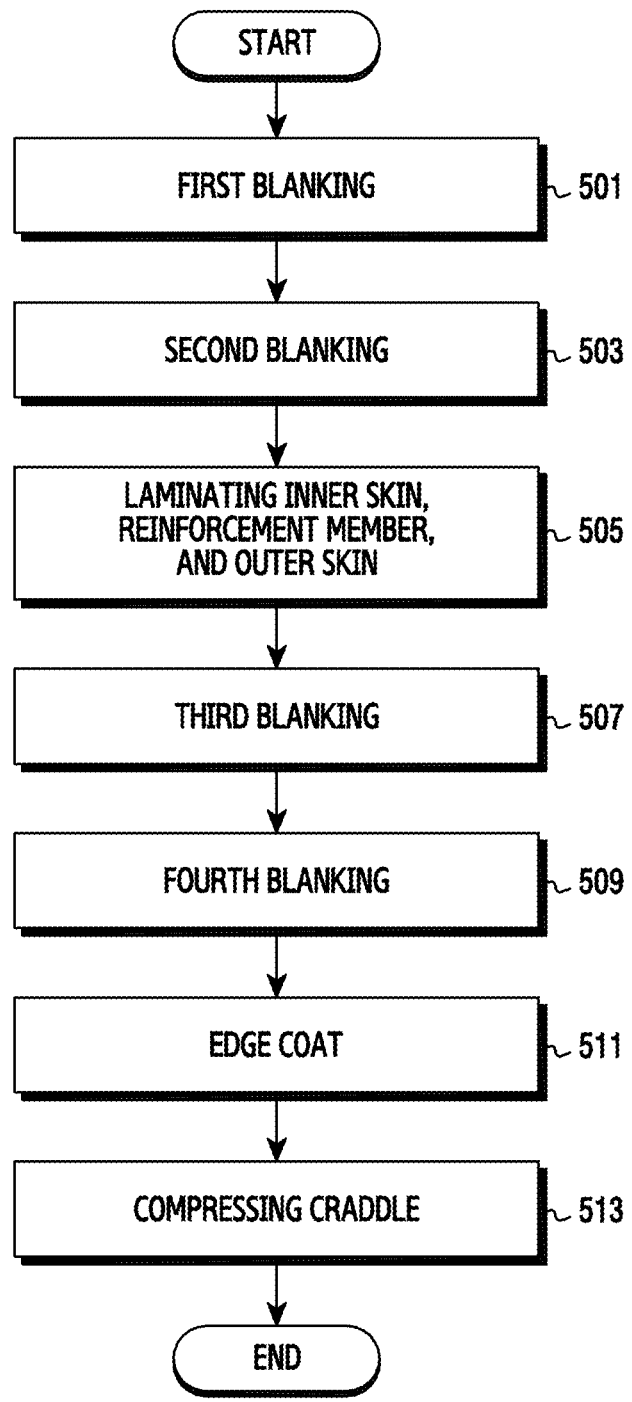
FIG. 5 is a flowchart illustrating a process for manufacturing a protective cover according to various embodiments of the present disclosure.

FIG. 5 is a flowchart illustrating a process for manufacturing a protective cover according to various embodiments of the present disclosure. FIGS. 6A to 6F are schematic views of a protective cover produced by the manufacturing process of FIG. 5, according to various embodiments of the present disclosure.

Figure 6A:
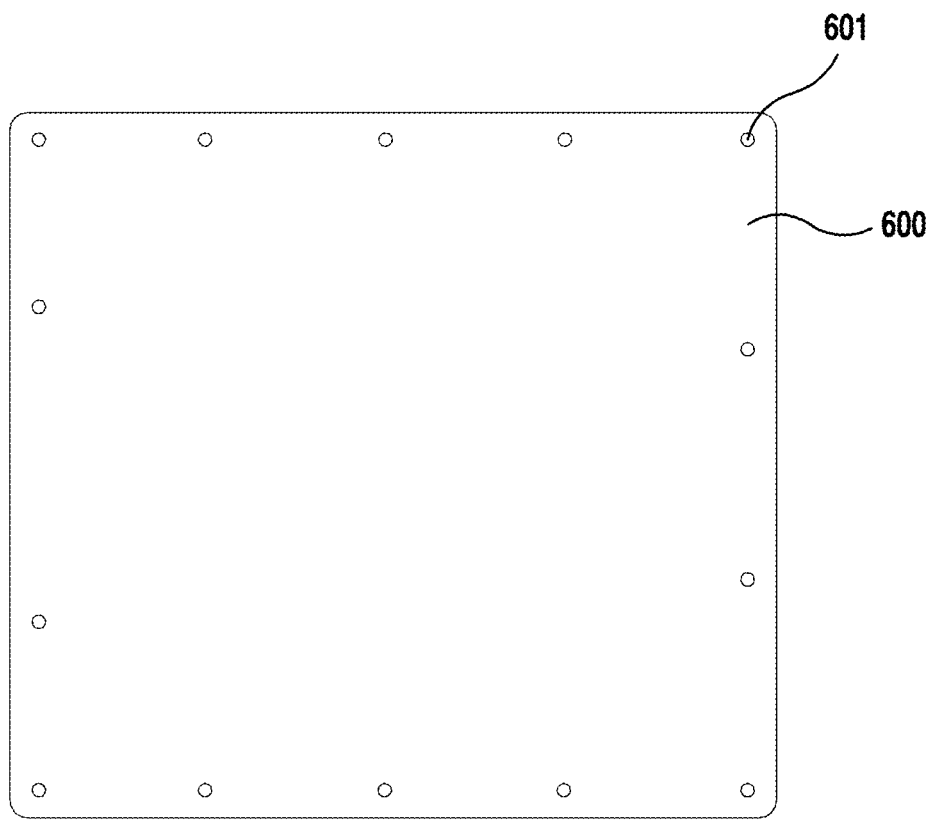
FIGS. 6A to 6F are schematic views of a protective cover produced by the manufacturing process of FIG. 5 according to various embodiments of the present disclosure.

Referring to FIG. 5 and FIGS. 6A to 6F, in step 501, a first blanking process is performed so as to form the inner skin of a PU material and the outer skin of a fabric member in an identical shape. Blanking is a process in which material is removed from an article of manufacture. According to various embodiments of the present disclosure, the blanking process may be individually performed in relation to the inner skin and the outer skin. At the time of the first blanking process in step 501, a base material may be blanked into a plane shape along a contour to be larger than the size of the protective cover and a plurality of guide holes may be punched along the peripheral edge thereof. As illustrated in FIG. 6A, the inner skin 600 may be formed with guide holes 601 along the peripheral edge thereof and the guide holes 601 may serve to align the openings of the inner skin 600 and the openings of the outer skin with each other in a subsequent process. The first blanking process in step 501 may be performed through a knife mold cutting process.

Figure 6B:
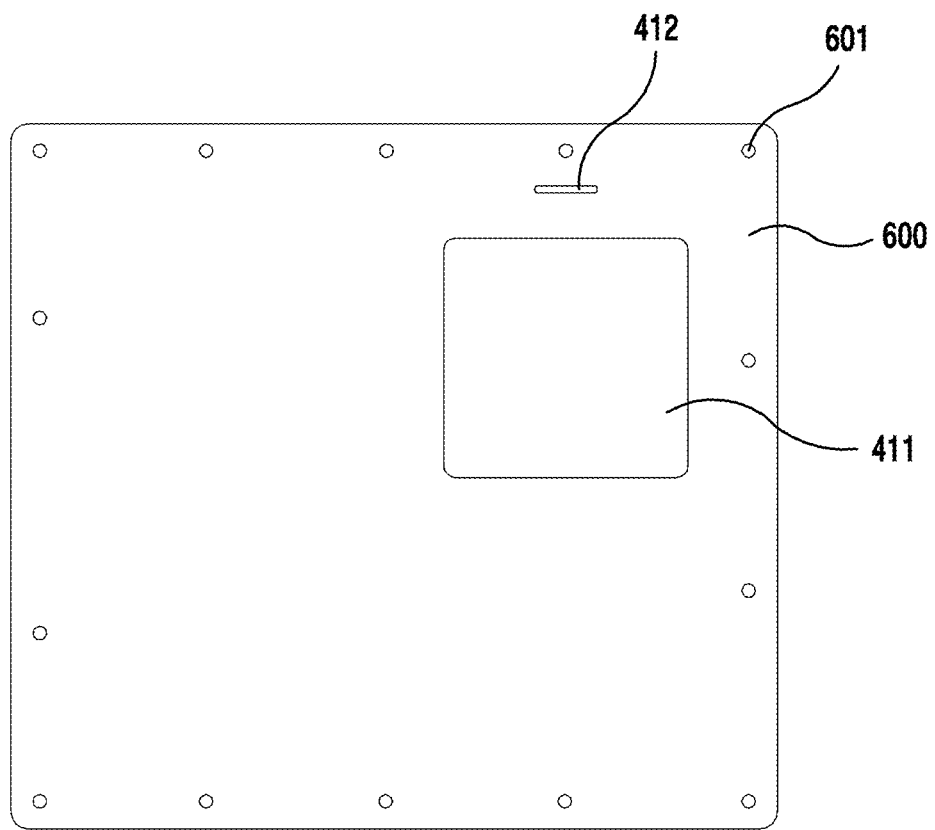

In step 503, a second blanking process is performed in order to form a plurality of openings for the electronic device at suitable places in the blanked inner skin 410. The second blanking process in step 503 forms various openings 411 and 412 for the electronic device in the region where the reinforcement member is applied when the inner skin 410 and the outer skin 420 are laminated, for example, as illustrated in FIG. 6B. The openings 411 and 412 include a window opening 411, to which the transparent window of the reinforcement member is applied and a receiver opening 412 arranged above the window opening 411. According to various embodiments of the present disclosure, the second blanking process in step 503 may be performed with precision through an ultrasonic cutting process.

In step 505, the inner skin 410 and the outer skin 420, each of which is blanked in the identical shape, may be laminated using the hot melt. In such a case, the reinforcement member 430 may be interposed between the inner skin 410 and the outer skin 420. According to various embodiments of the present disclosure, the inner skin 410 and the outer skin 420 may be bonded to each other by the hot melt not only in a region where the inner skin 410 and the outer skin 420 are directly in contact with each other, but also on the surfaces of the inner skin 410 and the outer skin 420 where the inner skin 410 and the outer skin 420 are in contact with the reinforcement plate 430.

Figure 6C:
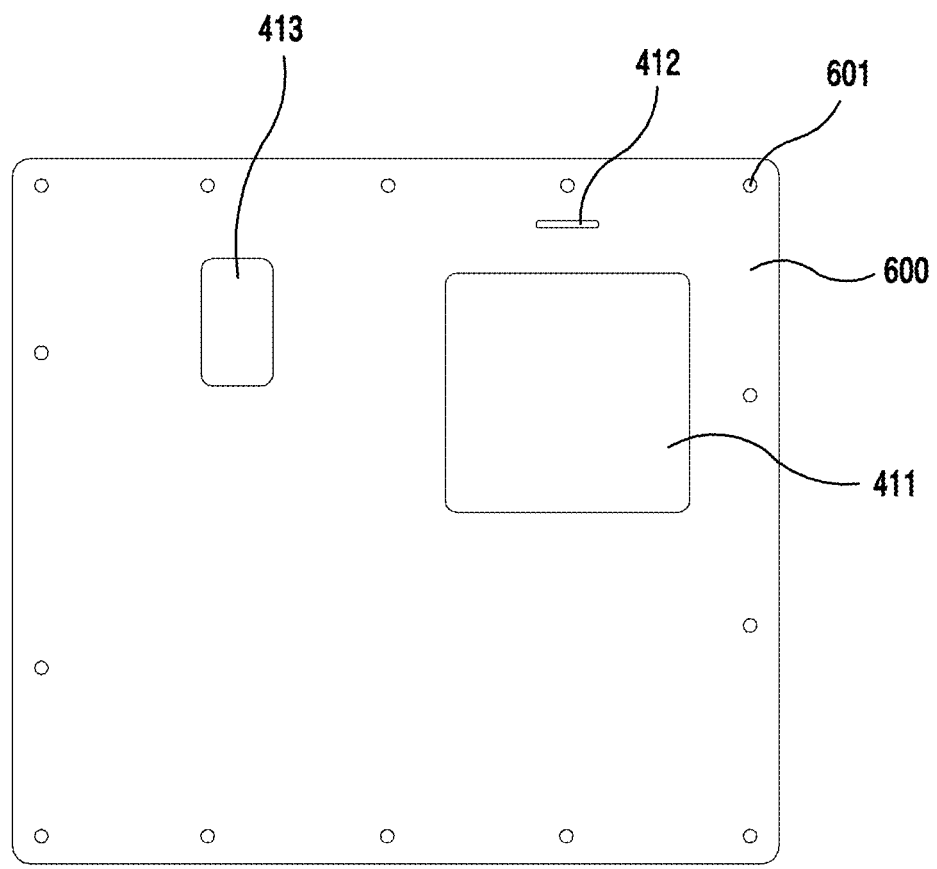

In step 507, a laminated preform 600 is further formed with a camera lens opening 413 by a third blanking process, as illustrated in FIG. 6C. However, without being limited thereto, a speaker opening for a speaker device placed on the rear surface of the electronic device may also be blanked.

The third blanking process in step 507 may be performed through an ultrasonic cutting process.

Figure 6D:
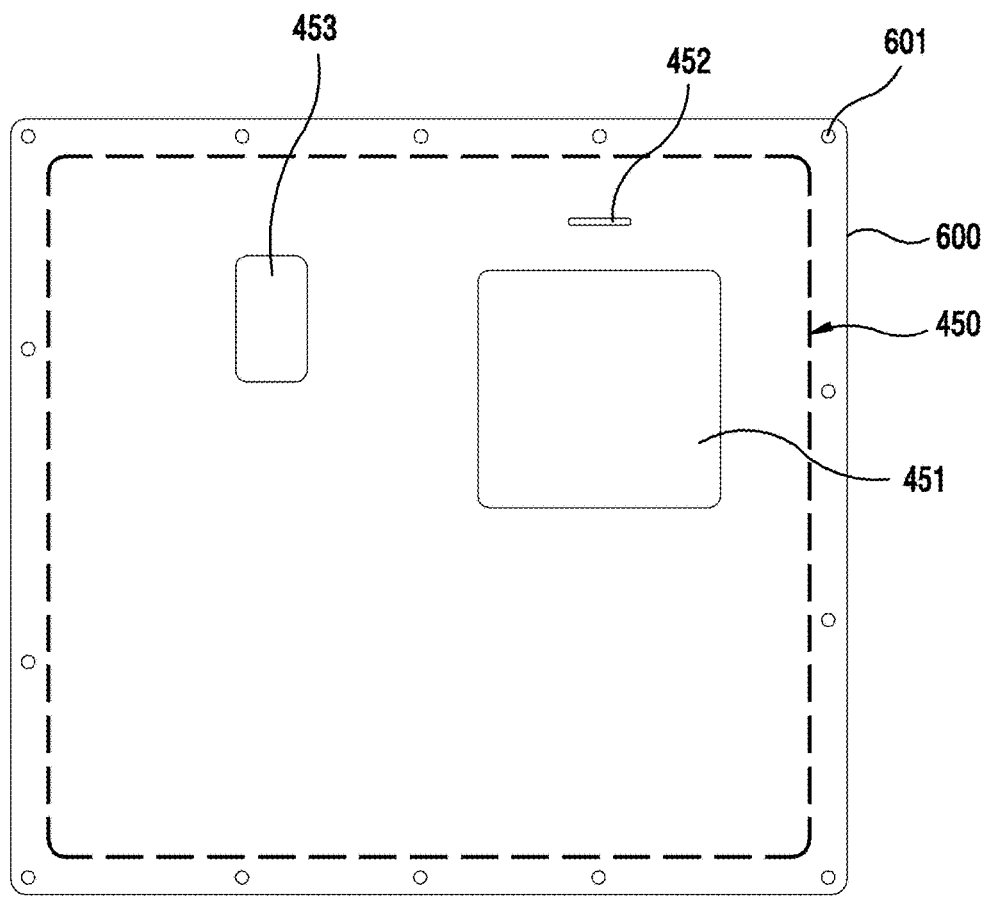
Figure 6E:
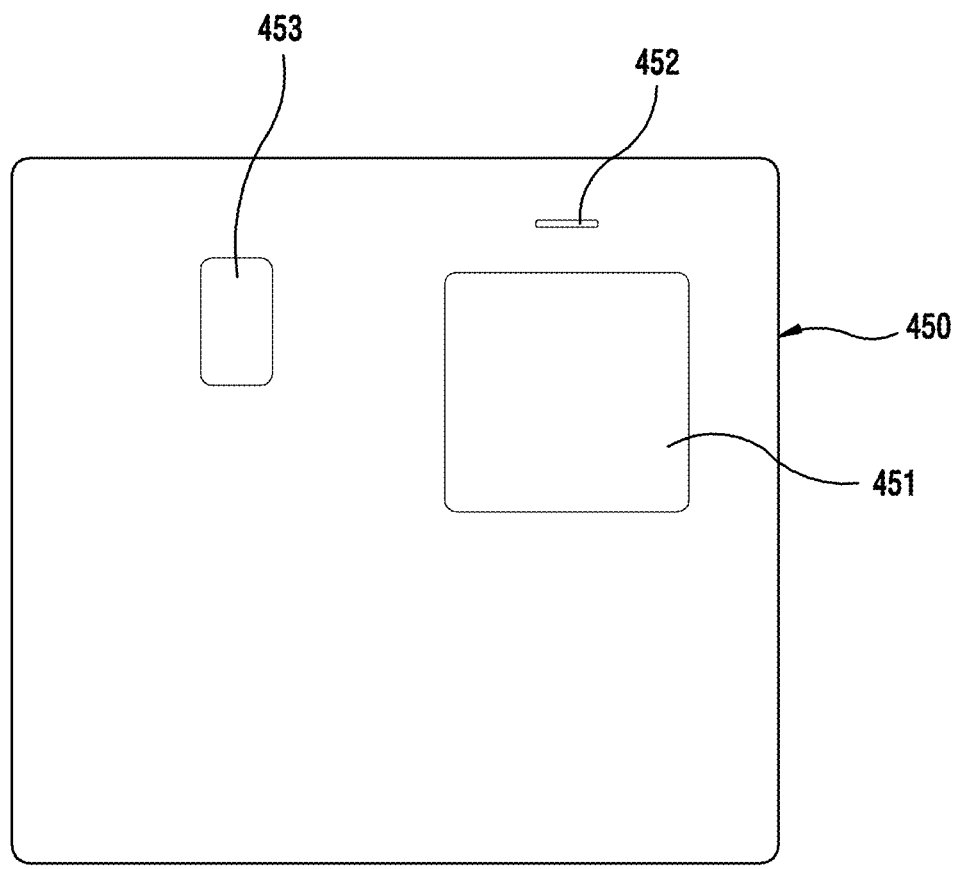

In step 509, a fourth blanking process is performed. As illustrated in FIGS. 6D and 6E, the fourth blanking process may be performed through a knife mold cutting process along a line that corresponds to the shape of the protective cover 450 (the portion indicated within the dotted line in FIG. 6D). According to various embodiments of the present disclosure, before performing the knife mold cutting process, thermo-compression is performed on the inner and outer portions with reference to the contour line of the protective cover 450 by performing hot stamping where the inner and outer portions are offset from each other by a predetermined amount. As a result of the thermo-compression process, the contour of the fabric member is hot-compressed to be completed without loosening.

Figure 6F:
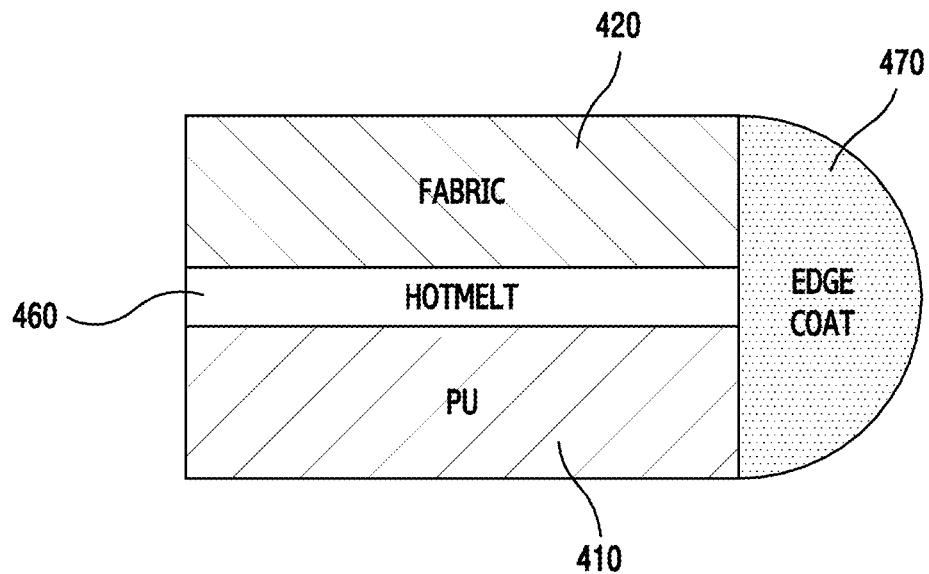

In step 511, as illustrated in FIG. 6F, an edge coat 470 is attached along the peripheral edge that was blanked by the knife mold cutting along the contour shape of the protective cover. Since the fabric member 420 does not have a backer, it is difficult to form a physical attachment region and the attachment reliability may be poor. Accordingly, in an embodiment of the present disclosure, a polyol such as polytetramethylene ether Glycol (PTMG) may be used. The PTMG is an ether-based polyol that has excellent properties in wear-resistance, cold-resistance, water-resistance, and has a characteristic of imparting varying flexibility depending on a curing condition. Polyproplene glycol (PPG) may also be used as the polyol. In step 513, the cradle is bonded to the inner skin 410 by hot melt through the thermo-compression method.

Figure 7:
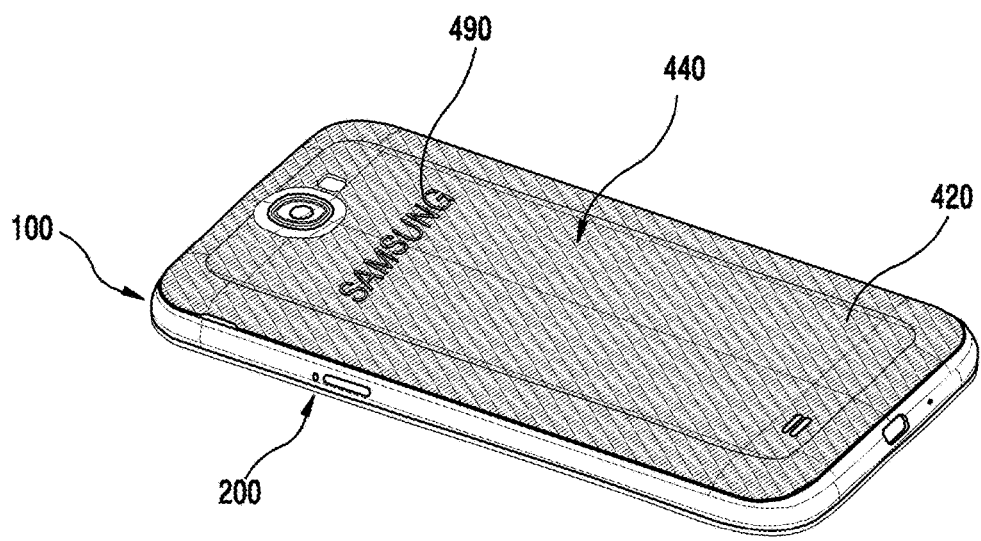
FIG. 7 is a rear perspective view of a protective cover for an electronic device according to various embodiments of the present disclosure.

FIG. 7 is a rear perspective view of a protective cover for electronic device according to various embodiments of the present disclosure.

Referring to FIG. 7, the protective cover 200 includes the cradle 440 to support the rear surface of the electronic device 100. The outer skin 420 may be adhered by hot melt through the thermo-compression method on the rear surface of the cradle 440. An ornamental member 490 (e.g., a manufacturer or product logo, or a decoration) may be further attached on the outer surface of the outer skin 420. According to various embodiments of the present disclosure, the ornamental member 490 may be attached through the thermo-compression process using hot melt since the ornamental member 490 may not be hot-stamped to the outer skin 420 made of a fabric material.

Figure 8A:
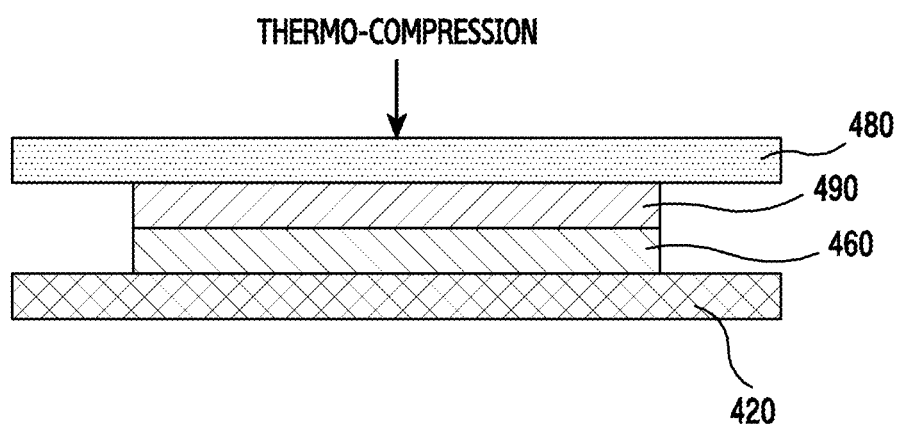
FIGS. 8A and 8B are schematic views illustrating a method of manufacturing and attaching an ornamental member that is applied to a fabric member according to various embodiments of the present disclosure.
Figure 8B:
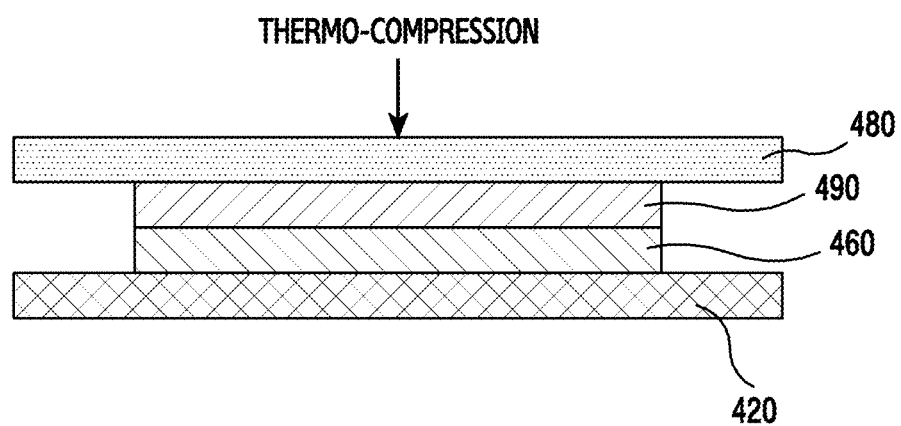
Figure 8C:
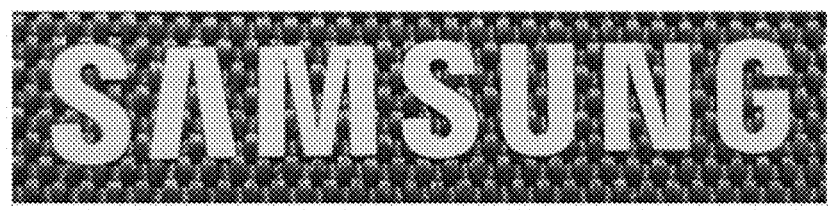
FIG. 8C is a photograph illustrating an ornamental member attached to a fabric member according to various embodiments of the present disclosure.

FIGS. 8A and 8B are schematic views illustrating a method of manufacturing and attaching an ornamental member that is applied to a fabric member according to various embodiments of the present disclosure. FIG. 8C is a photograph illustrating the ornamental member attached to the fabric member according to various embodiments of the present disclosure.

Referring to FIGS. 8A to 8C, when PU is used as a material of the ornamental member, a preform 490 made of a PU material is first laminated on a release paper 480 and hot melt 460 is laminated on the top of the preform 490. A region in which the preform 490 and the hot melt 460 are laminated may be cut to correspond to the shape of the ornamental member through a laser cutting process. According to various embodiments of the present disclosure, the release paper 480 is not cut, and only the preform 490 and the hot melt 460 are cut.

According to various embodiments of the present disclosure, the release paper 480, on which the preform 490 and the hot melt 460 cut by the laser cutting process are laminated, may be placed at a corresponding position on the fabric member 420 (i.e., the outer skin 420 of the protective cover 200) and attached thereto by thermo-compression, and then the release paper 480 may be removed, thereby completing assembly of the ornamental member.

Figure 9A:
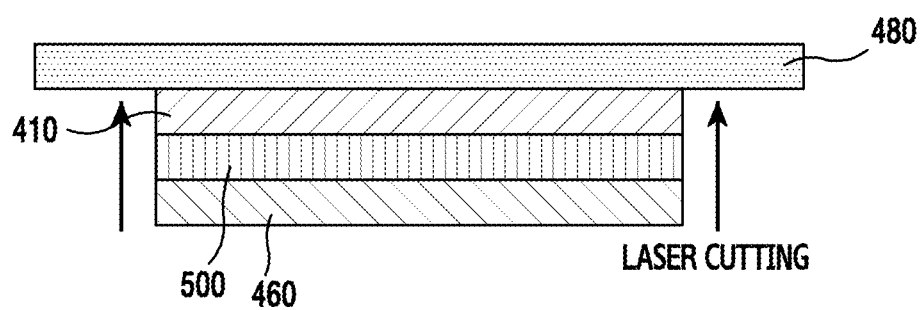
FIGS. 9A and 9B are views illustrating a method of manufacturing and attaching an ornamental member that is applied to a fabric member according to various embodiments of the present disclosure.
Figure 9B:
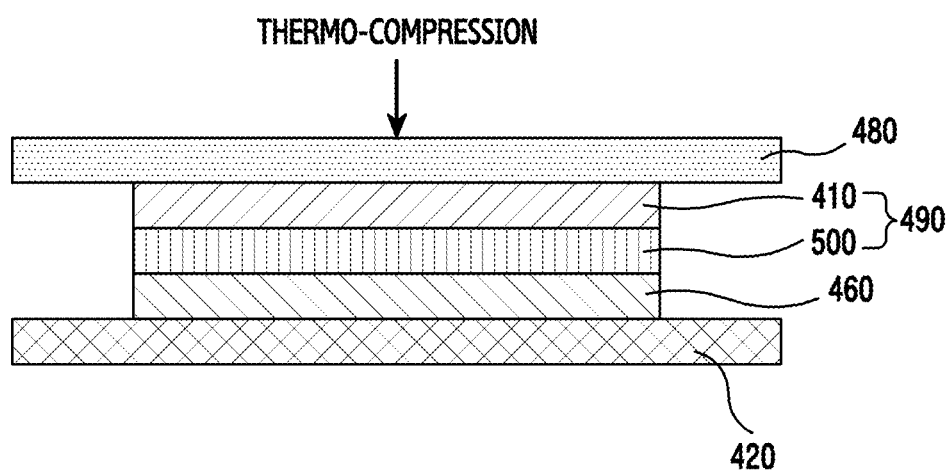

FIGS. 9A and 9B are views illustrating a method of manufacturing and attaching an ornamental member to be applied to a fabric member according to various embodiments of the present disclosure.

Referring to FIGS. 9A and 9B, a preform 410 (i.e., the inner skin 410 of the protective cover 200) for the ornamental member and hot melt 460 are laminated on a release paper 480. When the fabric form (weaved shape) of the outer skin 420 made of a fabric member appears on the ornamental member made of a PU material, due to the thinness of the preform 410 made of a PU material, a thermoplastic polyurethane (TPU) 500 may be laminated on PU material of the preform 410 between the preform 410 and the hot melt 460 to increase the overall height in order to prevent the appearance of the fabric form of the outer skin 420 on a surface of the preform 410. The region in which the preform 410, the TPU 500, and the hot melt 460 are laminated, may be cut to correspond to the shape of the ornamental member by a laser cutting process. According to various embodiments of the present disclosure, the release paper 480 may not be cut and only the preform 410, TPU 500 and the hot melt 460 may be cut.

According to various embodiments of the present disclosure, the release paper 480, on which an ornamental member layer 490 configured by the preform 410 and the TPU 500, which are cut by the laser cutting process, and the hot melt 460 are laminated, may be placed at a corresponding position on the fabric member (i.e., the outer skin 420 of the protective cover) and attached thereto by the thermo-compression, and then the release paper 480 may be removed, thereby completing assembly of the ornamental member.

The various embodiments of the present disclosure disclosed in the specification and the drawings are only examples presented in order to describe the technical details and help with comprehension of the present disclosure and do not limit the scope of the present disclosure. In addition to the embodiments disclosed herein, the scope of the various embodiments of the present disclosure should be construed to include all modifications or modified forms based on the technical idea of the various embodiments of the present disclosure. Therefore, the scope of the present disclosure should not be defined as being limited to the embodiments, but should be defined by the appended claims and equivalents thereof.

What is claimed is:

1. A protective cover comprising:
   an inner skin made of a polyurethane (PU) material;
   an outer skin formed of a fabric member having a shape corresponding to the inner skin and attached to the inner skin;
   a reinforcement member interposed in at least a portion between the inner skin and the outer skin; and
   a cradle attached to at least a portion of the outer skin to accommodate an electronic device,
   wherein the inner skin and the outer skin are blanked after corresponding inner and outer skin preforms are attached through a thermo-compression process using hot melt, along a peripheral edge of the protective cover within the preforms, and the inner skin and the outer skin are thermo-compressed and then cut along the peripheral edge of the protective cover, and
   wherein the cut protective cover has an edge coat that is formed of polyol including at least one of polytetramethylene ether glycol (PTMG) and polyproplene glycol (PPG) along the peripheral edge thereof.

2. The protective cover of claim 1, wherein the protective cover is blanked by a knife mold cutting process.

3. The protective cover of claim 1, wherein the inner skin and the outer skin include a plurality of guide holes that are formed along the peripheral edges thereof,
   wherein the guide holes are used for alignment of the inner skin and the outer skin when the inner skin and the outer skin are laminated.

4. The protective cover of claim 1, wherein the inner skin and the outer skin include at least one opening, which corresponds to an electronic component exposed to an outer surface of an electronic device that is accommodated in the protective cover, in each of the inner skin and the outer skin.

5. The protective cover of claim 4, wherein forming the opening is performed by an ultrasonic cutting process.

6. The protective cover of claim 4, wherein the opening includes at least one of a transparent window opening, a receiver opening, a speaker opening, a camera lens opening, and a sensor module opening.

7. The protective cover of claim 4, wherein at least a portion of the reinforcement member is used as a transparent window through the opening.

8. The protective cover of claim 1, wherein the cradle is adhered to at least a portion of the protective cover by thermo-compression using hot melt.

9. The protective cover of claim 1, further comprising an ornamental member to an outer surface of the outer skin of the fabric member of the protective cover.

10. The protective cover of claim 1, wherein the ornamental member is attached to the outer surface of the outer skin by laminating a preform of the ornamental member on a release paper, laminating hot melt on the laminated preform, laser-cutting the preform and the hot melt to correspond to a shape of the ornamental member, and removing the release paper after thermo-compressing the cut preform to the outer surface of the outer skin.

11. The protective cover of claim 10, wherein the preform includes polyurethane (PU) or thermoplastic polyurethane (TPU) that is laminated with the PU.

\* \* \* \* \*